United States Patent
Hicken et al.

(10) Patent No.: US 7,293,196 B2
(45) Date of Patent: *Nov. 6, 2007

(54) METHOD, APPARATUS, AND SYSTEM FOR PRESERVING CACHE DATA OF REDUNDANT STORAGE CONTROLLERS

(75) Inventors: Michael S. Hicken, Rochester, MN (US); James N. Snead, Eyota, MN (US)

(73) Assignee: Xiotech Corporation, Eden Prairie, MN (US)

( * ) Notice: Subject to any disclaimer, the term of this patent is extended or adjusted under 35 U.S.C. 154(b) by 516 days.

This patent is subject to a terminal disclaimer.

(21) Appl. No.: 10/434,489

(22) Filed: May 7, 2003

(65) Prior Publication Data

US 2003/0212864 A1 Nov. 13, 2003

Related U.S. Application Data (63) Continuation-in-part of application No. 10/430,487, filed on May 5, 2003, now Pat. No. 7,162,587.

(60) Provisional application No. 60/379,001, filed on May 8, 2002.

(51) Int. Cl.
  *G06F 12/16* (2006.01)
  *G06F 12/08* (2006.01)

(52) U.S. Cl. .................. 714/11; 711/144; 711/120; 711/122; 714/10; 714/6; 714/5

(58) Field of Classification Search .................... None
See application file for complete search history.

(56) References Cited

U.S. PATENT DOCUMENTS

| 5,699,510 | A  | * | 12/1997 | Petersen et al. | ............ 714/54 |
| 5,761,705 | A  | * | 6/1998  | DeKoning et al. | .......... 711/113 |
| 5,974,506 | A  | * | 10/1999 | Sicola et al.   | ............ 711/120 |
| 6,330,642 | B1 | * | 12/2001 | Carteau         | ............ 711/114 |
| 6,438,647 | B1 | * | 8/2002  | Nielson et al.  | ............ 711/113 |
| 6,571,324 | B1 | * | 5/2003  | Elkington et al.| .......... 711/162 |
| 6,681,339 | B2 | * | 1/2004  | McKean et al.   | ............ 714/5 |
| 6,801,954 | B1 | * | 10/2004 | Rust et al.     | ............ 710/7 |
| 2001/0020282 | A1 | * | 9/2001 | Murotani et al. | ............ 714/9 |
| 2004/0153727 | A1 | * | 8/2004 | Hicken et al.   | ............ 714/6 |

* cited by examiner

*Primary Examiner*—B. James Peikari
(74) *Attorney, Agent, or Firm*—Beck & Tysver, PLLC (57) ABSTRACT

A method, apparatus, and system for preserving the cache data of redundant storage controllers, by copying the recorded data blocks and the associated cache tags in the primary cache memory of a storage controller to a secondary cache memory of an alternate, redundant storage controller, wherein upon a failure occurring in the primary cache memory of any of the storage controllers, subsequent storage requests from a host, previously intended for processing by the failed storage controller, are processed through the secondary cache memory of a non-failed, redundant storage controller that contains the failed storage's controller cache data and cache tags.

11 Claims, 4 Drawing Sheets

METHOD, APPARATUS, AND SYSTEM FOR PRESERVING CACHE DATA OF REDUNDANT STORAGE CONTROLLERS

This application claims benefit of U.S. Provisional patent application No. 60/379,001, filed May 8, 2002, which is herein incorporated by reference. This patent application is a Continuation-In-Part of U.S. patent application Ser. No. 10/430,487, filed May 5, 2003, now issued as U.S. Pat. No. 7,162,587.

BACKGROUND OF THE INVENTION

1. Field of the Invention

The present invention generally relates to data storage systems, and more particularly, to storage systems that store redundant data.

2. Description of the Related Art

Modern mass storage subsystems are used within computer networks to provide increasing storage capacities to fulfill user demands from host computer system applications. Unfortunately, access to the memory of the mass storage subsystems is slow, and as the sizes of the storage systems grow, access becomes even slower. A cost effective solution to this problem provides a cache between the host computer and the storage system. The primary purpose of a cache is to preserve data already in a primary cache that has not yet been committed to persistent memory. Caches are also used to temporarily store instructions or data that may be repeatedly accessed by a host, in order to increase the processing speed by avoiding the longer step of loading the instructions or data from the memory of the storage system. More specifically, the first time an instruction or data location is addressed, it must be accessed from the lower speed disk memory. Subsequent accesses to the same instruction or data are done via the faster cache memory, thereby minimizing access time and enhancing overall system performance. Typically, each cache is associated with a cache controller, which manages the transfer of data between the host and the cache memory.

With the increasing size of the mass storage subsystems, the reliance on such large mass storage subsystems also generates a need for enhanced reliability. Various system configurations and geometries are commonly applied to meet the demands for higher storage capacity while maintaining or enhancing reliability of the mass storage subsystems.

A popular solution to these demands for increased capacity and reliability in mass storage subsystems is the use of multiple storage modules configured in geometries that permit redundancy of stored data to assure data integrity in the case of system failures. Some of these systems in particular include redundant cache controllers. The primary purpose of such redundant cache controller systems is to preserve data already in a primary cache that has not yet been committed to persistent memory. Such data is referred to as "dirty data". In some prior art systems including redundant cache controllers, a cache memory is shared by the redundant cache controllers, such that if one of the cache controllers fails, the redundant cache controller(s) maintains access to the cache memory and the data or instructions stored in the cache memory by the failed controller. Unfortunately, in such configurations, if the shared cache memory itself fails, any data or instructions stored in the failed cache memory would be lost.

In other systems including redundant cache controllers, each cache controller includes a dedicated cache memory. A significant challenge in such systems with redundant cache controllers is maintaining "cache coherency" without adversely affecting system performance. One solution to the problem of maintaining cache coherency is to maintain identical caches in each of the subsystems. In a first cache coherency maintenance solution, the entire cache may be periodically transmitted from the main cache to each of the remaining redundant cache(s). In a second cache coherency maintenance solution, each time a cache operation occurs for one cache, the redundant cache(s) is (are) notified of the operation and sent any corresponding data. As such, each of the redundant cache(s) is (are) updated. These two implementations have an obvious problem; during the periodic transmission of the cache data from the main cache to each of the remaining redundant cache(s), the redundant cache(s) is (are) not available for receiving any storage requests from a host, resulting in an increase of processing time. The first solution has additional problems. Firstly, the overhead associated with the data transmissions counteracts the benefits of having a cache. Secondly, the cache is not actually coherent at all times. That is, the data is vulnerable to loss during the sizeable period between transmissions.

Therefore it is apparent that a need exists in the art for a method and apparatus for preserving the dirty data of a failed redundant cache memory, which further reduces the overhead processing time of a data storage system and further increases system reliability.

SUMMARY OF THE INVENTION

The disadvantages of the prior art are overcome by a method, apparatus, and system for preserving the cache data of redundant storage controllers without compromising the processing of host computer storage requests by the primary cache memory of an alternate, redundant storage controller.

In one embodiment of the present invention a method for preserving cache data of redundant storage controllers includes, receiving a storage request from a host in a storage controller, recording a data block in response to the storage request in the primary cache memory of the receiving storage controller, creating a cache tag for the recorded data block and recording the cache tag in the primary cache memory of the receiving storage controller, and copying the recorded data block and the recorded cache tag to the secondary cache memory of the alternate storage controller. Additionally the method includes, upon a failure of the primary cache memory of either of the redundant storage controllers, detecting the failure and processing subsequent storage requests from the host, previously intended for processing by the failed storage controller, through the secondary cache memory of the non-failed storage controller.

BRIEF DESCRIPTION OF THE DRAWINGS

So that the manner in which the above recited features of the present invention are attained and can be understood in detail, a more particular description of the invention, briefly summarized above, may be had by reference to the embodiments thereof which are illustrated in the appended drawings.

It is to be noted, however, that the appended drawings illustrate only typical embodiments of this invention and are therefore not to be considered limiting of its scope, for the invention may admit to other equally effective embodiments.

DETAILED DESCRIPTION

Figure 1:
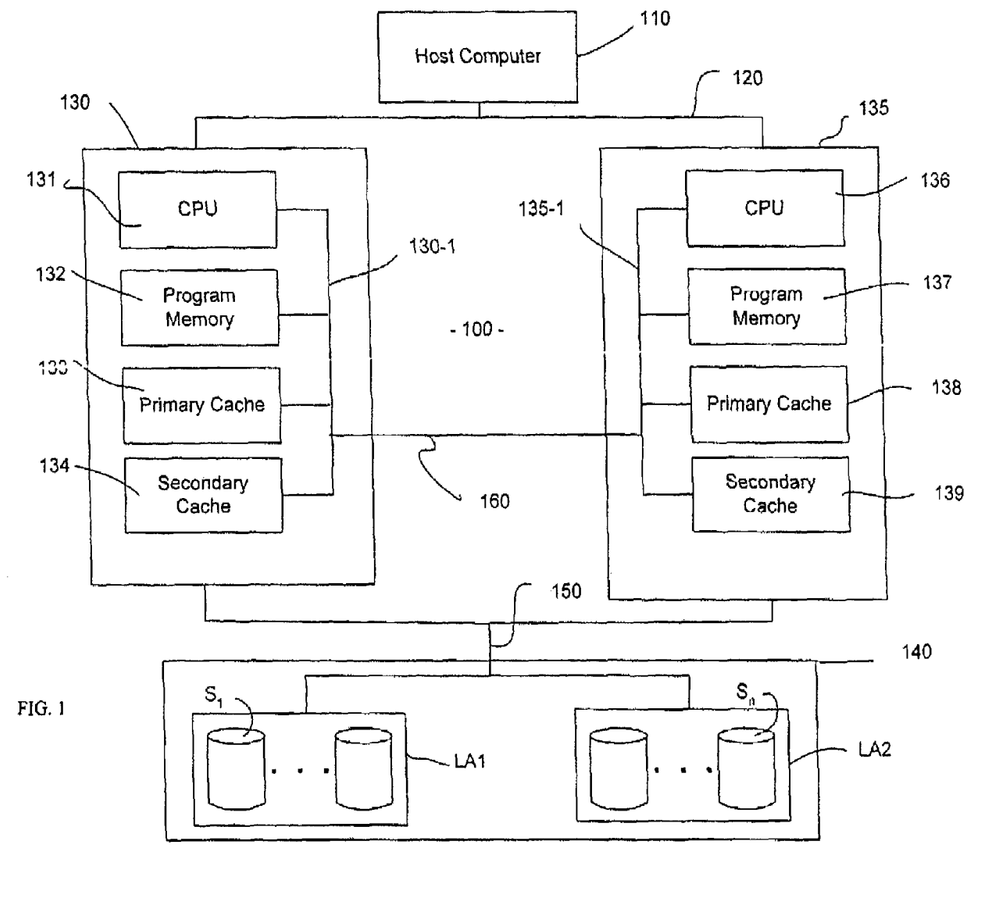
FIG. 1 depicts a high level block diagram of a storage subsystem having redundant storage controllers each including a primary and secondary cache memory in accordance with an embodiment of the present invention.

FIG. 1 depicts a high-level block diagram of a storage subsystem having redundant storage controllers each including a primary and secondary cache memory in accordance with an embodiment of the present invention. In the storage subsystem 100 shown in FIG. 1, a host computer 110 is coupled by a bus 120 to a first storage controller 130 and a second storage controller 135 (two controllers being shown by way of example only). Each of the storage controllers 130 and 135 is coupled to each of a plurality of storage units S1-Sn in an array 140 by an I/O bus (or busses) 150. Array 140 is divided into logical array one (LA1) and logical array two (LA2). In the embodiment illustrated, LA1 is associated with the first storage controller 130, and LA2 is associated with the second storage controller 135. One of ordinary skill in the art will readily recognize that the interface bus 150 between the storage controllers 130 and 135 and disk array 140 (including disk drives S1-Sn) may be any of several industry standard interface busses including SCSI, IDE, EIDE, IPI, Fiber Channel, SSA, PCI, etc. Circuits (not shown) within the storage controllers 130 and 135 appropriate to the controlling bus 150 are well known to those of ordinary skill in the art. The interface bus 120 between the storage controllers 130 and 135 and the host computer 110 may be any of several standard industry interface busses including SCSI, Ethernet (LAN), Token Ring (LAN), etc. Circuits (not shown) within the storage controllers 130 and 135 appropriate to controlling the bus 120 are well known to those of ordinary skill in the art.

The first storage controller 130 includes a CPU 131, a program memory 132 (e.g. ROM/RAM devices for storing program instructions and variables for the operation of CPU 131), and the primary cache memory 133 for storing data and control information related to the data stored in the disk array 140. The CPU 131, the program memory 132, and the primary cache memory 133 are connected via the memory bus 130-1 to enable the CPU 131 to store and retrieve information in the memory devices. In addition, the first storage controller 130 includes a secondary cache memory 134 also connected via the memory bus 130-1.

The second storage controller 135 is identical to the first storage controller 130 and is comprised of a CPU 136, a program memory 137 and a primary cache memory 138, all interconnected via a memory bus 135-1. As in the first storage controller 130, the second storage controller 135 also includes a secondary cache memory 139, which is also connected to the memory bus 135-1. To permit each storage controller to communicate with the other, the storage controllers 130 and 135 are interconnected via the shared busses 160.

Each CPU 131 or 136 within each of the storage controller 130 or 135 can manipulate the secondary cache memory 134 or 139, respectively, of the other storage controller via the shared busses 160. The primary cache memory 133 of the first storage controller 130 is used by the CPU 131 via the bus 130-1 to buffer storage requests to or from the storage units S1-Sn. The secondary cache memory 134 is reserved for use by the alternate second storage controller 135 via the shared busses 160. Similarly, the primary cache memory 138 in the second storage controller 135 is used by the CPU 136 via the bus 135-1 to buffer storage requests to or from the storage units S1-Sn, as the secondary cache memory 139 is reserved for use by the alternate first storage controller 130 via the shared busses 160.

The storage controllers 130 and 135 are interchangeable devices within the storage subsystem 100 to permit easy replacement, including hot swap, of a defective storage controller. One of ordinary skill in the art will readily recognize that the block diagram of FIG. 1 is intended only as an exemplary design, which may embody the present invention. Many alternate controller and subsystem designs may embody the methods and associated apparatus and structures of the present invention.

Typically, each of the storage controllers 130 and 135 is assigned a subset of the storage units S1-Sn in the array 140. Each of the storage units S1-Sn comprises non-overlapping groups of data blocks. As such, the storage units S1-Sn are logically grouped into two logical arrays LA1 and LA2. The two storage controllers 130 and 135 correspond one-to-one with the two logical arrays LA1, LA2 and interface the logical arrays LA1, LA2 with the host computer 110. That is, each of the logical arrays LA1, LA2 is controlled by a corresponding storage controller 130, 135. If a storage controller 130 or 135 fails, the other storage controller 135, 130 assumes operational control of both of the logical arrays LA1, LA2. In normal operation, since each of the logical arrays LA1 and LA2 is controlled by only one of the storage controllers 130, 135, both of the storage controllers 130, 135 can be active simultaneously without concern that data access "collisions" will occur.

Briefly stated, each of the controllers 130, 135 monitors storage requests from the host computer 110 on essentially a continuous basis. Requests are directed to either the first logical array LA1 (and thus the first storage controller 130) or the second logical array LA2 (and thus the second storage controller 135). Each of the storage controllers 130,135 is active in parallel with the other to maintain cache information in its own primary cache memory as well as the secondary cache memory of the alternate storage controller. The first storage controller 130 maintains cache information related to management of LA1 in its primary cache memory 133 and in the secondary cache memory 139 of the second storage controller 135. Conversely, the second storage controller 135 maintains cache information related to management of LA2 in its primary cache memory 138 and in the secondary cache memory 134 of the first storage controller 130. In this mode, each storage controller maintains a complete snapshot of the present cache information as maintained by itself and the alternate storage controller. Since each controller 130, 135 performs substantially the same functions, the functionality of the present invention is described below essentially with respect to only the first storage controller 130 for ease of understanding.

Initially, the first storage controller 130 determines whether a storage request has been received. If a storage request has been received, then the pending data block associated with the storage request is written to the primary cache memory 133. Storage requests from the host computer 110 can be either Write requests or Read requests. In the case of a Write request, the data block, associated with the storage request and recorded in the primary cache memory 133, is representative of the write data (data from the host computer intended for a storage unit). If the storage request is a Read request, the data block associated with the storage request and recorded in the primary cache memory 133 is representative of the read data (request from the host computer for data from a storage unit). A Cache tag is generated for the recorded data block and recorded in the primary cache memory 133 of the first storage controller 135. A Cache tag is a subset of the full address of the corresponding memory block. A compare match of an incoming address with one of the tags within the cache tag field in the primary cache memory indicates a cache "hit." Additionally, the cache tag is configured to indicate whether or not the recorded data block comprises dirty data.

The cache tag and pending data block written to the primary cache memory 133 are then immediately written (mirrored) to the secondary cache memory 139 of the second storage controller 135. It will be appreciated by those skilled in the art though, that various, known mirroring techniques can be employed within the present invention. For example, the SCSI write buffer command may be used to transfer the data to be mirrored from the controller containing the primary cache memory to the controller containing the secondary cache memory.

Subsequently, an acknowledge is sent to the host computer 110 only after the cache tag and pending data block have been completely written to the secondary cache memory 139 of the second storage controller 135. Furthermore, during the writing (mirroring) process, storage requests from the host computer 110 to the primary cache memory 133 of the first storage controller 130 are allowed to execute independently in parallel when the data accessed does not overlap with any data already in the primary cache memory. If new storage write requests from the host computer overlaps with data in process of being mirrored, this new write request from the host waits for the mirror operation to complete to ensure that the primary cache memory 133 of the first storage controller 130 does not obtain any dirty data that would not also be contained or mirrored in the secondary cache memory 139 of the second storage controller 135. This technique ensures coherency of the data in the primary cache memory 133 of the first storage controller 130 and the secondary cache memory 139 of the redundant second storage controller 135. As evident from FIG. 1 and the above functionality disclosure, the storage subsystem of the present invention provides redundant storage of cache data while permitting operation of the storage subsystem in response to host computer storage requests. It should be noted that the operation of the primary cache memory 138 of the second storage controller 135 is not affected in any manner by the interaction between the primary cache memory 133 of the first storage controller 130 and the secondary cache memory 139 of the redundant second storage controller 135. Thus the ability of the primary cache memory 138 of the redundant second storage controller 135 to respond to storage requests during interaction between its secondary cache memory 139 and the primary cache memory 133 of the first storage controller 130 is in no way negatively affected or delayed.

Figure 2:
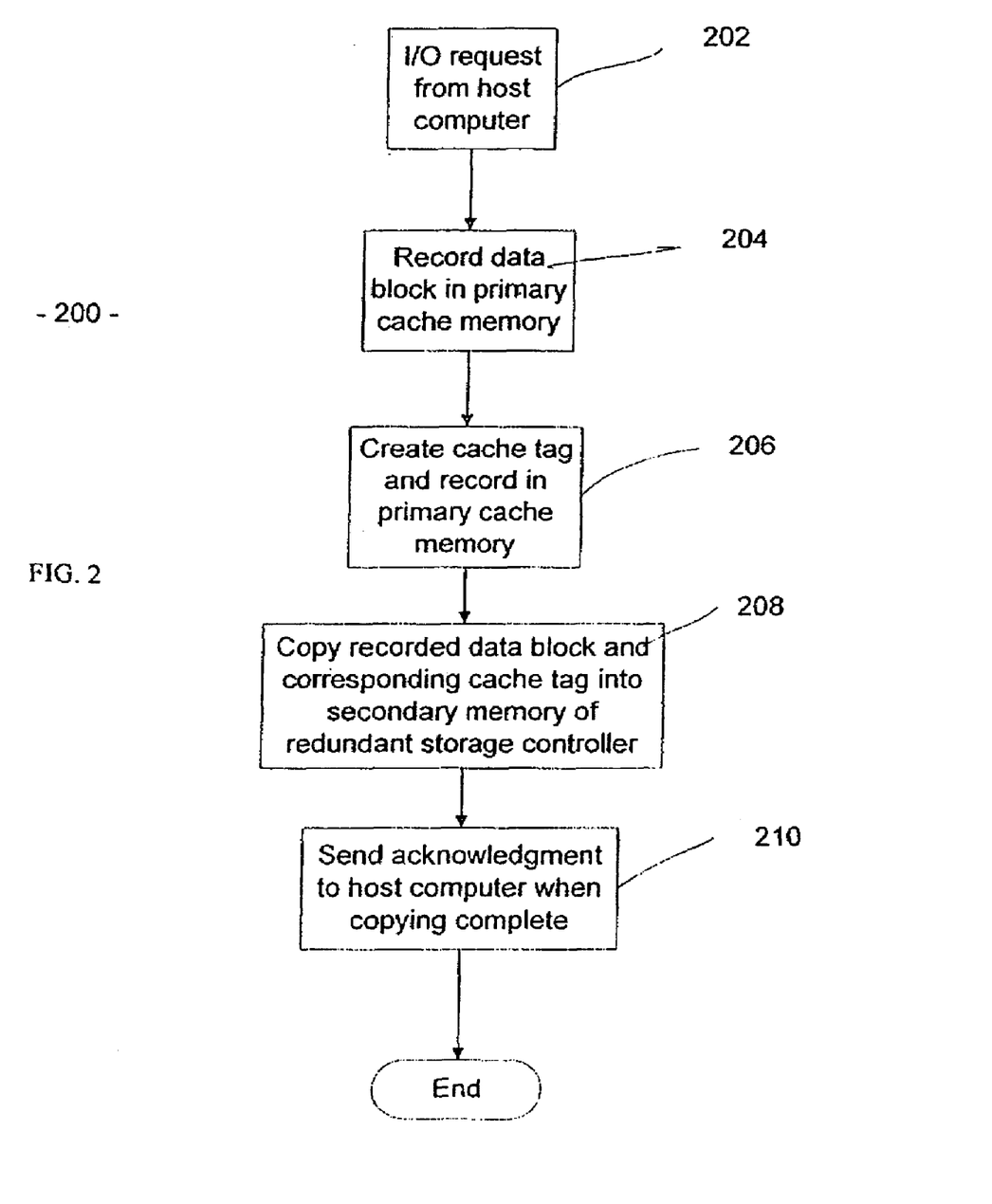
FIG. 2 depicts a flow diagram of an embodiment of a method of the present invention.

FIG. 2 depicts a flow diagram of the above-described method of the present invention. The method 200 is entered at step 202 wherein a storage controller determines whether a storage request has been received from the host computer. At step 204 and upon receiving a storage request, the pending data block associated with the storage request is written to the primary cache memory of the storage controller. At step 206, a cache tag identifying the data block (including whether the data block is dirty data) is created for the recorded data block and recorded in the primary cache of the storage controller that received the storage request from the host computer. At step 208, the recorded data block and corresponding cache tag are mirrored and copied to the secondary cache memory of an alternate (redundant) storage controller.

During the writing (mirroring) process, storage requests from the host computer to the primary cache memory of the storage controller that received the storage request are allowed to execute independently in parallel when the data accessed does not overlap with any data already in the primary cache memory. If new storage write requests from the host computer overlaps with data in process of being mirrored, this new write request from the host waits for the mirror operation to complete to ensure that the primary cache memory of the storage controller that received the storage request does not obtain any dirty data that would not also be contained or mirrored in the secondary cache memory of the redundant storage controller. It should be noted that the operation of the primary cache memory of the redundant storage controller is not affected in any manner by the interaction between the primary cache memory of the storage controller that received the storage request and the secondary cache memory of the redundant storage controller. Thus the ability of a primary cache memory of the redundant controller to respond to storage requests from a host during interaction between its secondary cache memory and the primary cache memory of the storage controller that received the storage request is in no way negatively affected or delayed.

At step 210 and upon completion of the mirroring process, (e.g., the data block and corresponding cache tag are completely copied into the secondary cache memory of the redundant storage controller) an acknowledgement is transmitted to the host computer. The method 200 is performed in parallel by each storage controller. The method 200 ends after step 210 is completed.

A cache may be flushed periodically or when certain predefined conditions are met. Flushing techniques and schedules are well known in the art, and it would be appreciated by one skilled in the art, that the subject invention can advantageously employ a plurality of flushing techniques as long as the cache tags of a secondary cache memory of a redundant storage controller are "zeroed" (cleared) upon a flush of the dirty data in a primary cache memory of a first storage controller. For example, when the dirty data blocks are flushed from the primary cache memory 133 of the first storage controller 130 to store the data blocks on the intended storage device of LA1, the cache tags in the primary cache memory 133 corresponding to the flushed data blocks are reset to indicate that those data blocks are no longer dirty, and the mirrored cache tags for the corresponding data blocks in the secondary cache memory 139 of the second storage controller 135 are "zeroed". There is no need to delete any data blocks in the secondary cache memory 130 of the storage controller 135, because when the associated cache tags are zeroed, the data blocks in the secondary cache memory 139 corresponding to those zeroed cache tags can be subsequently overwritten. This method saves any processing time that would be associated with deleting those data blocks in the secondary cache memory 139. As evident from the above description, the read data would remain on both the primary cache memory 133 of the first storage controller 130 and the secondary cache memory 139 of the redundant second storage controller 135 while any flushed dirty data previously in the primary cache memory of the first storage controller is deleted from the secondary cache memory of the redundant second storage controller. As such, upon a failure of the primary cache memory 133 of the first storage controller 130, the storage units will not need to be searched upon a subsequent storage request from the host computer 110 for read data blocks that were previously recorded in the primary cache memory 133 of the first storage controller 130, because the read data blocks remain in the secondary cache memory 139 of the redundant second storage controller 135.

Figure 3:
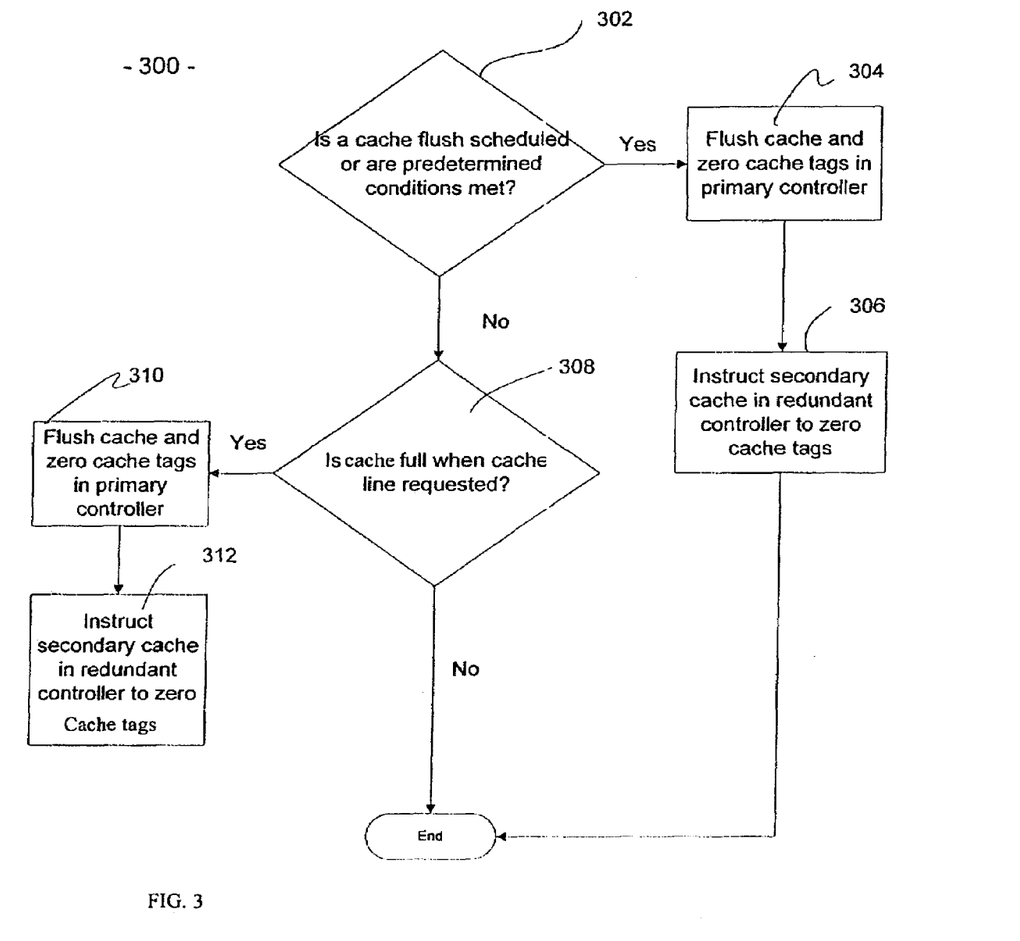
FIG. 3 depicts a flow diagram of a conventional cache memory flush process that can be employed in the storage subsystem of FIG. 1.

FIG. 3 depicts a flow diagram of a conventional cache memory flush process 300 that can be employed in the storage subsystem of FIG. 1. Accordingly, as shown in steps 302, 304, and 306, if a cache flush is scheduled or if predetermined conditions for a cache flush are met (step 302), the cache memory is flushed as shown in step 304. That is, dirty data in a primary cache memory of a storage controller is written to the persistent memory (storage units). As the lines of data are flushed, the corresponding cache tags in the primary cache memory of the storage controller responding to the storage request are reset to indicate that the flushed data is no longer dirty data, and the corresponding cache tags in a secondary cache memory of a redundant storage controller are zeroed (step 306). This instruction may be communicated to the secondary cache memory of the redundant storage controller via a shared bus between the storage controllers, such as shared busses 160 between storage controllers 130,135 in the storage subsystem 100 of FIG. 1. This process is implemented to ensure that the secondary cache memory of the redundant storage controller will not include stale data (data flushed from the primary storage controller to the storage units). Further, as shown in steps 308, 310, and 312, if the primary cache memory of a storage controller is full of dirty data blocks when an storage request is sent to the storage controller (Step 308), dirty data blocks in the primary cache memory of the storage controller that received the storage request are flushed by a replacement algorithm to accommodate the storage request. The corresponding cache tags of the flushed data in the primary storage controller are reset to indicate that the data is no longer dirty data (Step 310). Additionally, the mirrored cache tags in the secondary cache memory of the redundant storage controller corresponding to the flushed dirty data are zeroed (Step 312).

Once again, because each controller 130,135 performs substantially the same functions, the functionality of the present invention with respect to a failure is described below with respect to a failure of the first storage controller 130 and the functionality of the second storage controller 135 in response to the failure.

When a failure occurs within the first storage controller 130, and more specifically in the primary cache memory 133 of the first storage controller 130, the failure is detected by the redundant second storage controller 135. Many failure detection techniques exist in the art, and it will be appreciated by those skilled in the art that any of the failure detection techniques functional in the application of the present invention, can be advantageously employed in the present invention. For example, the occurrence of a non-correctable ECC error in the primary cache memory can be used to detect a failure in the first storage controller 130.

Upon detection of a failure of the first storage controller 130, the host computer addresses any storage requests intended for LA1, originally processed by the first storage controller 130, to the secondary cache memory 139 of the redundant second storage controller 135 utilizing bus 120, processor 136, and memory bus 135-1. Accordingly and as mentioned above, upon detection of the failure of the first storage controller 130, the second storage controller 135 assumes operational control of both logical arrays LA1, LA2. At this point, the storage subsystem operates as a system with one storage controller 135 and two cache memories 138,139, each of the cache memories 138, 139 corresponding to an individual logical array LA2, LA1, respectively. That is, the secondary cache memory 139 of the second controller 135, now performs the function of the failed primary cache memory 133 of the first storage controller 130.

Preferably, the secondary cache memory 139 of the remaining storage controller 135 is flushed as soon as possible after the detection of the failure of the primary cache memory 133 of the first storage controller 130, in order to flush the dirty data that was copied from primary cache memory 133 of the first storage controller 130 to the appropriate storage unit(s). Additionally, the primary cache memory 138 of the remaining storage controller 135 is flushed at the same time as the secondary cache memory 139, to take full advantage of the flushing time required, thus minimizing processing time.

Subsequently, if either the primary cache memory 138 or the secondary cache memory 139 of the storage controller 135 become disabled, the remaining cache memory is configured to operate as the cache memory for all of the storage requests from the host computer 110 intended for both LA1 and LA2.

It should be noted that the secondary cache memory 139 of the remaining storage controller 135 could subsequently be configured to operate within various embodiments. Examples of these alternative embodiments for the functionality of the secondary memory 139 of the second storage controller 135 are disclosed and claimed in commonly-assigned U.S. patent application Ser. No. 10/430,487, filed May 5, 2003, issued as U.S. Pat. No. 7,162,587), entitled "METHOD AND APPARATUS FOR RECOVERING REDUNDANT CACHE DATA OF A FAILED CONTROLLER AND REESTABLISHING REDUNDANCY", which is herein incorporated by reference in its entirety. Briefly stated, a structured list of cache tags is created identifying the data blocks in the secondary cache memory 139 for minimizing a delay associated with processing a storage request from the host computer 110. In addition the secondary cache memory 139 of the storage controller 135 can be configured to function as a redundant cache memory for the primary cache memory 138. Alternatively, the storage controller 135 can also be configured to operate in conjunction with another available storage controller to again establish a redundant cache storage subsystem as the storage subsystem 100 of FIG.1

Figure 4:
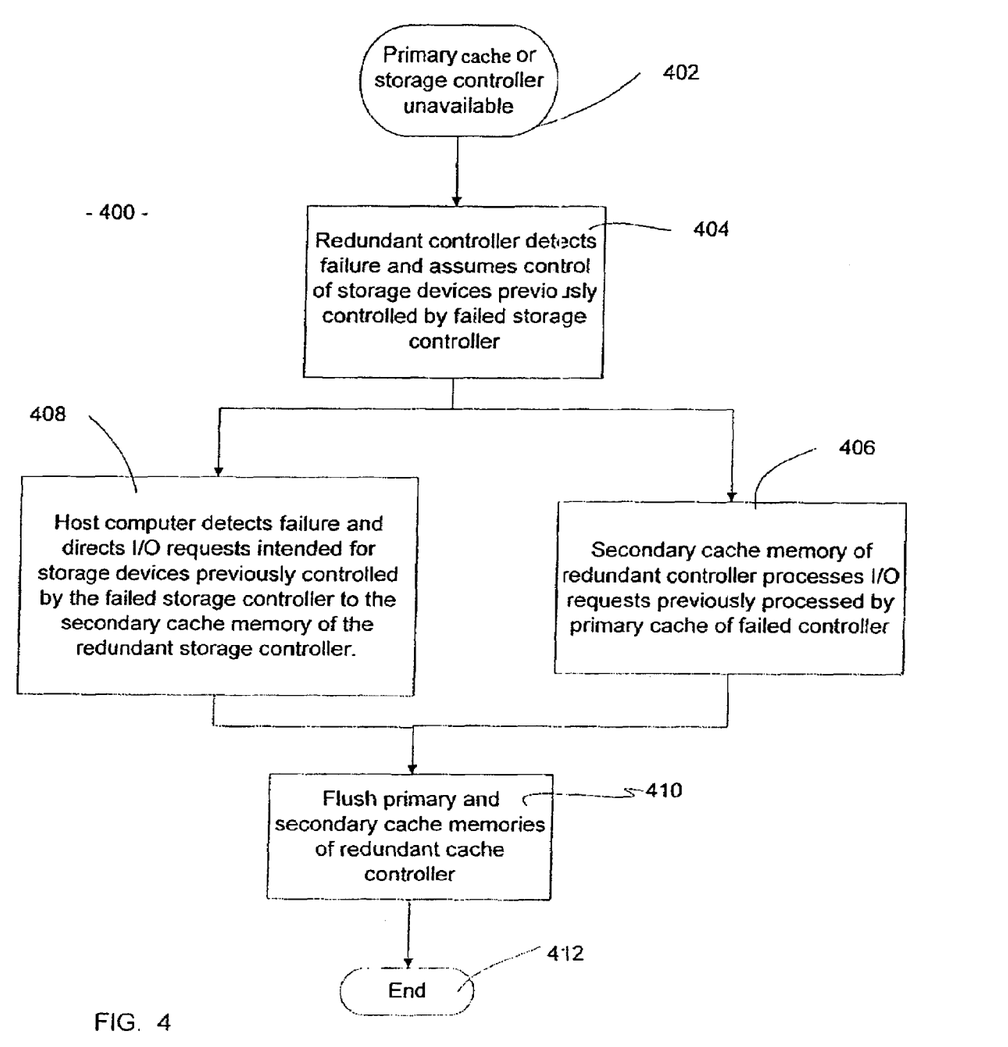
FIG. 4 depicts a flow diagram of a response of the present invention to the detection of a failed storage controller.

FIG. 4 depicts a flow diagram of a response of the present invention to a failure detection of a storage controller. The method 400 is entered at step 402 wherein a failure occurs in a primary cache of a storage controller. At step 404, a redundant controller detects the failure and assumes control of the storage devices previously controlled by the failed storage controller.

At step 406, the secondary cache memory of the redundant second storage controller, containing mirrored copies of the data blocks and cache tags of the primary cache memory of the failed storage controller, is configured to process any storage requests from the host computer intended for the failed storage controller, which was configured to control specific storage devices. For example, in the storage subsystem 100 of FIG. 1, when the first storage controller 130 fails (primary cache memory 133 not available), the redundant second storage controller 135 assumes control of both LA1 and LA2 and any storage requests intended for LA1 are directed to the secondary cache memory 139 of the redundant second storage controller 135.

At step 408, performed substantially in parallel with step 406, the host computer detects the failure of the first storage controller and directs any storage requests intended for the storage units previously controlled by the failed storage controller, to the secondary cache memory of the redundant storage controller.

At step 410, the primary cache memory and the secondary cache memory of the remaining (not failed) second storage controller are flushed (applicable flushing techniques were described above). Although in this embodiment of a method of the present invention, the primary cache memory and the secondary cache memory of the second storage controller are depicted as being flushed at step 410, it will be appreciated by one skilled in the art that the cache memories can be advantageously flushed at different times and utilizing various methods. Preferably, the cache memories of the redundant controller should be flushed as soon as possible after the failure of the first storage controller in order to flush the dirty data in the secondary cache memory of the second storage controller previously contained in the primary cache memory of the failed storage controller and to take full advantage of the required flushing processing time.

The method 400 ends at step 412.

While the foregoing is directed to the preferred embodiment of the present invention, other and further embodiments of the invention may be devised without departing from the basic scope thereof, and the scope thereof is determined by the claims that follow.

What is claimed is:

1. In a cache-redundant storage system comprising at least two redundant storage controllers, each of the storage controllers comprising a primary cache memory and a secondary cache memory, a method for preserving cache data of the two redundant storage controllers, comprising: receiving a storage request from a host into one of the redundant storage controllers; recording a data block in response to the storage request in the primary cache memory of the receiving storage controller; creating a cache tag for said recorded data block and recording said cache tag in said primary cache memory of the receiving storage controller; copying the recorded data block and the recorded cache tag to the secondary cache memory of another of the redundant storage controllers; and upon a failure of the primary cache memory of a redundant storage controller, detecting the failure and processing subsequent storage requests from the host, previously intended for processing by the failed storage controller, through the secondary cache memory of said another of the redundant storage controllers.

2. The method of claim 1, further comprising: sending an acknowledgment to said host after the step of copying is complete.

3. The method of claim 1, wherein said cache tag identifies whether a data block contains dirty data.

4. The method of claim 1, wherein upon a flush of the primary cache memory of one of the redundant storage controllers, any cache tags recorded in the primary cache memory of the flushed storage controller corresponding to dirty data blocks recorded in the primary cache memory of the flushed storage controller are reset to indicate that the recorded data blocks are now resident data blocks, and the corresponding cache tags copied to the secondary cache memory of said another redundant storage controller.

5. The method of claim 1, wherein said storage request is a write request from the host.

6. The method of claim 5, wherein said data block recorded in response to said write request comprises write data.

7. The method of claim 1, wherein said storage request is a read request from the host.

8. The method of claim 7, wherein said data block recorded in response to said read request comprises read data.

9. A storage controller for preserving cache data of a redundant storage controller, comprising: a program memory, for storing program instructions; a processor for executing said program instructions; a primary cache memory, for recording cache data and cache tags; a secondary cache memory, for recording a copy of cache data and cache tags of said redundant storage controller; a local bus shared by the processor, the program memory, the primary cache memory, and the secondary cache memory; and a shared bus, shared by said storage controller and said second storage controller; said processor executing said program instructions to configure said storage controller, upon a failure of the primary cache memory of said redundant storage controller, to perform the steps of: detecting the failure of the primary cache memory of said redundant storage controller; and processing subsequent storage requests from the host, previously intended for processing by the failed redundant storage controller, through the secondary cache memory of the storage controller.

10. A system, comprising: an array of storage units; and at least two storage controllers; each storage controller, comprising: means for controlling a predetermined subsection of the array of storage units, a primary cache memory for storing cache data and cache tags; and a secondary cache memory for storing a copy of cache data and cache tags of a the primary cache memory of another of said storage controllers; and means for recording a data block and a cache tag in its primary cache memory and for copying said recorded data block and cache tag into the secondary cache memory of another of said storage controller; means for detecting a failure of the primary cache memory of the storage controller for which the secondary cache contains a copy of the failed primary cache memory's cache data and cache tags, and means for processing subsequent storage requests from the host, previously intended for processing by the failed storage controller, through its secondary cache memory.

11. A storage controller for preserving cache data of a redundant second storage controller, comprising: a means for receiving a storage request from a host; a means for recording a data block in response to said storage request in a primary cache memory of the storage controller; a means for creating a cache tag for said recorded data block and recording said cache tag in said primary cache memory; a means for copying the recorded data block and the cache tag of said primary cache memory to a secondary cache memory of the redundant second storage controller; and a means for detecting a failure of said primary cache memory of the redundant second storage controller, and upon detection of said failure, processing subsequent storage requests from the host, previously intended for processing by the failed redundant second storage controller, through a secondary cache memory of the storage controller.

* * * * *

UNITED STATES PATENT AND TRADEMARK OFFICE
CERTIFICATE OF CORRECTION

PATENT NO. : 7,293,196 B2  
APPLICATION NO. : 10/434489  
DATED : November 6, 2007  
INVENTOR(S) : Michael S. Hicken Page 1 of 1

It is certified that error appears in the above-identified patent and that said Letters Patent is hereby corrected as shown below:

Column 8, Line 52  
After "FIG. 1" insert --.--.

Column 10, line 38 (Claim 10, line 7)  
Before "the" delete "a".

Signed and Sealed this

Thirteenth Day of May, 2008

JON W. DUDAS  
*Director of the United States Patent and Trademark Office*